D. GODÓ.
WAGON WHEEL LOCK.
APPLICATION FILED NOV. 24, 1915.
1,176,442.
Patented Mar. 21, 1916.
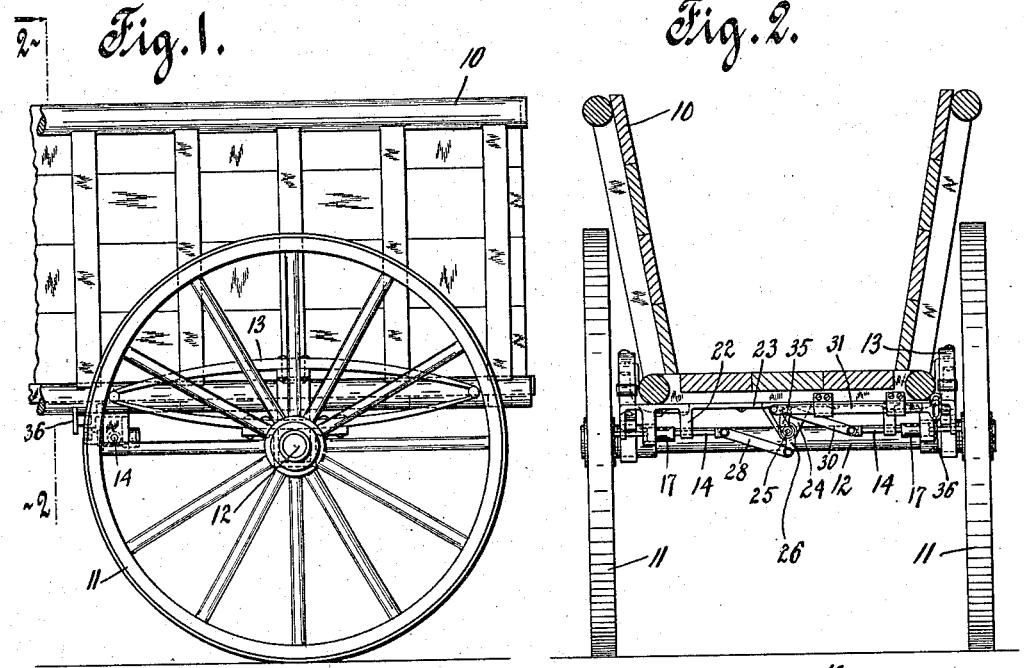
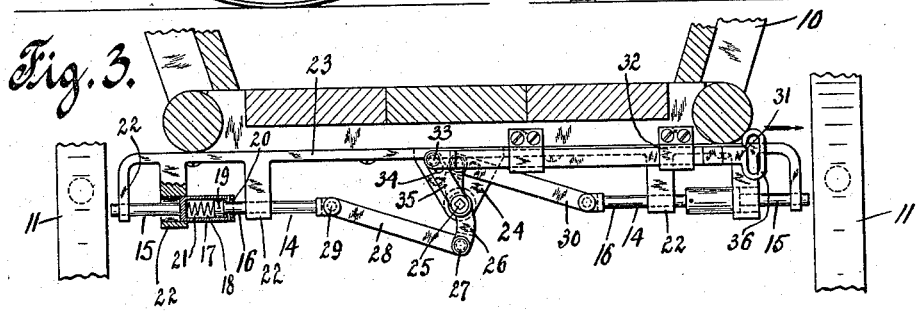
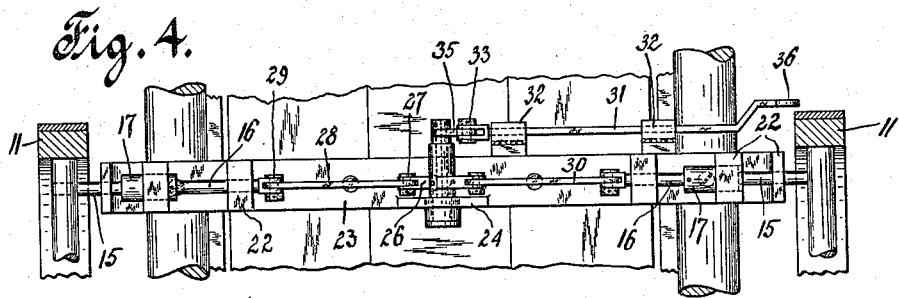
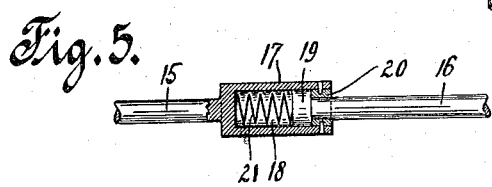
WITNESS
ch. Raue.
INVENTOR
D. Godó
BY
Sigmund Herzog
his ATTORNEY

UNITED STATES PATENT OFFICE.

DAVID GODÓ, OF NEW YORK, N. Y.

WAGON-WHEEL LOCK.

1,176,442.

Specification of Letters Patent. Patented Mar. 21, 1916.

Application filed November 24, 1915. Serial No. 63,300.

*To all whom it may concern:*

Be it known that I, DAVID GODÓ, a subject of the King of Hungary, and a resident of the city of New York, in the county of New York and State of New York, have invented certain new and useful Improvements in Wagon-Wheel Locks, of which the following is a specification.

The present invention relates to an attachment for vehicles, such as wagons, etc. It relates more particularly to a lock for the wheels thereof, which, when applied, prevents a rotation of the wheels, or in other words motion of the vehicle. Devices of this type are particularly useful in connection with delivery wagons or similar vehicles, which are left frequently unattended by the driver. The driver, before leaving, applies the lock, and thereby prevents a runaway or accidental movement of the vehicle.

The main object of the present invention is to provide a wagon wheel lock which is simple in construction, efficient in operation, and which can be manufactured on a commercial scale, or in other words one which is not so difficult to produce as to be beyond the reasonable cost of such a contrivance.

Another object of the invention is to construct a lock of the type described which can be easily and conveniently attached to all types of vehicles.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1 is a side elevation of the rear portion of a vehicle provided with a wheel lock, constructed in accordance with the present invention; Fig. 2 is a section taken on line 2—2 of Fig. 1; Fig. 3 is a front elevation, partly in section, of the lock and the parts coacting therewith; Fig. 4 is a bottom plan view of the detail shown in Fig. 3; and Fig. 5 is a section taken through a portion of one of the locking bolts on a larger scale.

In the drawings, the invention is shown applied to a farm wagon for purposes of illustration, attention, however, is called to the fact that it can be used in connection with other vehicles just as well.

Referring to the drawings, the numeral 10 indicates the rear portion of a wagon body, and the numerals 11 the rear wheels thereof. These wheels are mounted upon the rear axle 12, the latter being connected with the body by means of springs 13.

The wheel lock comprises two bolts 14, each of which is made of two sections, to wit: 15 and 16. The section 15 of each bolt is provided with an enlargement 17, having a cylindrical bore 18, in which is slidably disposed a piston-like head 19, that is carried by the corresponding section 16. To prevent a disengagement of these two sections of a bolt, there is fixedly attached, in rear of the piston-like head 19, a stop 20 to the cylindrical enlargement 17. In each bore 18 is disposed a spring 21, tending to force the sections 15 and 16 of a locking bolt in opposite directions, for a purpose hereinafter to be described.

The locking bolts are slidably arranged in guides 22, which are carried by a base frame 23, the latter being secured to the bottom of the wagon body in parallel relation to the rear axle 12, or in other words transversely. From the base plate 23 depends, preferably, in the longitudinal axis of the wagon body a hanger bearing 24, in which is rotatably journaled a spindle 25, to the latter being fixedly attached a lever 26. The spindle 25 is disposed parallel to the longitudinal axis of the wagon body. To one end of the lever 26 is pivoted at 27 a link 28, the other end of said link being pivoted at 29 to the section 16 of one of the locking bolts. The other end of the lever is connected in a similar manner by a link 30 with the section 16 of the other locking bolt.

The locking bolts are operated by an actuating bar 31, which is slidably arranged in guides 32, carried by the base plate 23. This actuating bar is provided at its inner end with a pin 33, that is seated in a slot 34 in a lever 35, the latter being rigidly fastened to the spindle 25. The outer end of the bar is provided with an eye 36, to be grasped by the hand of the operator. The bar 31 extends, preferably, in parallel relation to the locking bolts from the longitudinal center line of the wagon body to one of the sides of the same.

The operation of this device is as follows: Normally the parts are in the positions shown in Figs. 2 and 3 of the drawings, in which the locking bolts are in their retracted positions, or in other words disengaged from the rear wheels. If it is intended to lock the wheels against rotation, the actuating bar 31 is shifted in the direction of the arrow shown in Fig. 3 of the drawings, whereby the said locking bolts move in opposite directions and are projected into the path of the spokes, as clearly shown in Fig. 5 of the drawings, thereby locking the wheels against movement. The locking bolts are made of two sections for the following reasons: If, in projecting the locking bolts, the outer ends of one or of the other of the same does not come into registering position with a space between two spokes of a wheel, but is forced against one of the spokes thereof, the movement of the section 16 of the locking bolt will be completed, but the corresponding section 15 cannot move through its full stroke. If this should be the case, the respective spring 21 is compressed, or in other words the section 15 of the said locking bolt is put under tension. If now the wheels move accidentally, the section 15 of the locking bolt will be shot into the space between two spokes of the wheel by the said spring as soon as it is disengaged from the spoke, against which it abuts in the manner described.

In order to unlock the wheel, it is simply necessary to shift the actuating bar 31 in the direction opposite to that indicated by the arrow shown in Fig. 3 of the drawings.

What I claim is:—

1. The combination with a wagon body, one of its axles and the wheels mounted thereon, of two locking bolts slidably mounted upon said body in parallel relation to said axle, each of said bolts being made of two sections, a spring inserted between the two sections of each bolt, a lever fulcrumed intermediate its ends to said body, links connecting said locking bolts with the ends of said lever, whereby upon shifting of said lever said locking bolts are caused to move in opposite directions, and an actuating bar connected with said lever, said bolts being normally disengaged from said wheels and adapted to be projected between the spokes thereof upon shifting said bar.

2. The combination with a wagon body, one of its axles and the wheels mounted thereon, of two locking bolts slidably mounted upon said body in parallel relation to said axle, each of said locking bolts being made of two sections, a spring inserted between the two sections of each bolt, a lever fulcrumed intermediate its ends to said body, links connecting the inner sections of said bolts with the ends of said lever, whereby upon shifting of said lever the inner sections of said bolts are caused to move in opposite directions, the spring coöperating with each bolt forcing upon moving its inner section the outer section associated therewith in the same direction, and an actuating bar connected with said lever, said bolts being normally disengaged from said wheels and adapted to be projected between the spokes thereof upon shifting said bar.

Signed at New York, in the county of New York, and State of New York this 19th day of Nov., A. D. 1915.

DAVID GODÓ.